US012612080B2

(12) United States Patent
Govindhan

(10) Patent No.: US 12,612,080 B2
(45) Date of Patent: Apr. 28, 2026

(54) SYSTEM AND METHOD FOR GENERATING A TRAJECTORY OF AN AT LEAST PARTIALLY AUTONOMOUS MOTOR VEHICLE

(71) Applicant: VALEO SCHALTER UND SENSOREN GMBH, Bietigheim-Bissingen (DE)

(72) Inventor: Nirmalgautham Govindhan, Chennai (IN)

( * ) Notice: Subject to any disclaimer, the term of this patent is extended or adjusted under 35 U.S.C. 154(b) by 145 days.

(21) Appl. No.: 18/288,471

(22) PCT Filed: Apr. 27, 2022

(86) PCT No.: PCT/EP2022/061214
§ 371 (c)(1),
(2) Date: Oct. 26, 2023

(87) PCT Pub. No.: WO2022/229263
PCT Pub. Date: Nov. 3, 2022

(65) Prior Publication Data
US 2024/0227860 A1      Jul. 11, 2024

(30) Foreign Application Priority Data
Apr. 28, 2021     (IN) .............................. 202141019440

(51) Int. Cl.
*B60W 60/00*          (2020.01)
*G08G 1/16*           (2006.01)
(52) U.S. Cl.
CPC ......... *B60W 60/0017* (2020.02); *G08G 1/166* (2013.01)

(58) Field of Classification Search
CPC ............. B60W 60/0017; B60W 30/06; B60W 60/001; B60W 60/00; G08G 1/166; G08G 1/168; B62D 15/0285
(Continued)

(56) References Cited

U.S. PATENT DOCUMENTS

| | | | |
|---|---|---|---|
| 2010/0063680 A1* | 3/2010 | Tolstedt | ............... G05D 1/0214 701/1 |
| 2013/0090802 A1* | 4/2013 | Curtis | .................. G05D 1/0278 701/25 |
| 2019/0077458 A1 | 3/2019 | Khlifi | |

FOREIGN PATENT DOCUMENTS

| | | |
|---|---|---|
| DE | 102017210221 A1 | 12/2018 |
| EP | 2330472 A1 | 6/2011 |

(Continued)

OTHER PUBLICATIONS

International Search Report and Written Opinion in corresponding International Application No. PCT/EP2022/061214, dated Sep. 27, 2022 (10 pages).
(Continued)

*Primary Examiner* — Shardul D Patel
(74) *Attorney, Agent, or Firm* — Osha Bergman Watanabe & Burton LLP

(57) ABSTRACT
The invention relates to a method for generating a trajectory (22) for a motor vehicle (1), the method comprising the steps of detecting a path (8), which is walked by a person (9) and generating the trajectory (22) for the motor vehicle (1) based on the detected path (8). Furthermore, the invention relates to computer program product, a computer-readable storage medium as well as an assistance system (2).

14 Claims, 4 Drawing Sheets

Figure 2:
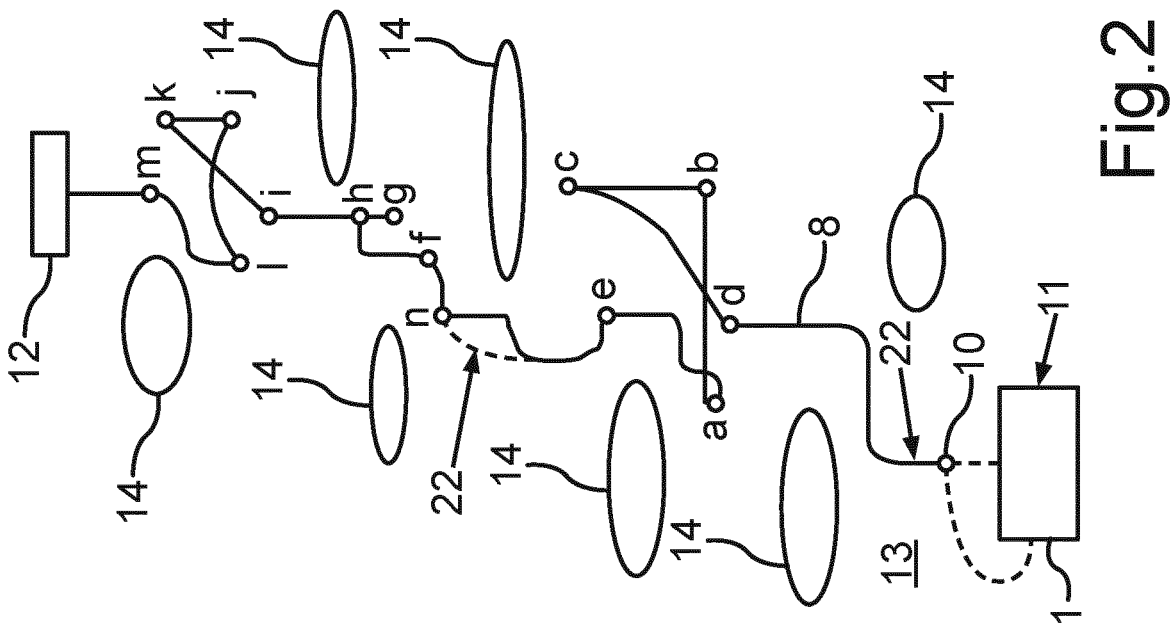

(58) Field of Classification Search
USPC ........................................................ 701/26
See application file for complete search history.

(56)                       References Cited

FOREIGN PATENT DOCUMENTS

| | | | |
|---|---|---|---|
| JP | 2015001778 | A | 1/2015 |
| KR | 20180032017 | A | 3/2018 |

OTHER PUBLICATIONS

Office Action issued in counterpart Japanese Patent Application No. 2023-566603 mailed Nov. 12, 2024 (8 pages).
Notice of Preliminary Rejection in corresponding Korean Application No. 10-2023-7040856, dated Jul. 18, 2025 (11 pages).

* cited by examiner

SYSTEM AND METHOD FOR GENERATING A TRAJECTORY OF AN AT LEAST PARTIALLY AUTONOMOUS MOTOR VEHICLE

TECHNICAL FIELD

The invention relates to a method for generating a trajectory of an at least partially autonomous motor vehicle. Furthermore, the invention relates to a computer program product, a computer readable storage medium as well as a corresponding assistance system.

BACKGROUND

It is known that when a vehicle maneuver has to be taken place in difficult terrain, but the driver is not sure about passing the road ahead, the driver may get out of the motor vehicle and checks the possible paths of the motor vehicle. In particular, the driver will get down of the motor vehicle and check the surroundings at every point of the trajectory to determine the drivable path. Therefore, the motor vehicle is not completely used, in particular if the motor vehicle is an at least partially autonomous motor vehicle.

DE 10 2017 210 221 A1 discloses a method for the longitudinal and lateral guidance of a motor vehicle, comprising the steps of determining environmental data relating to the environment of the motor vehicle, determining several possible trajectories for a future driving movement of the motor vehicle, detecting a selection of operator input, selection of a selected trajectory from the possible trajectories depending on the selection of operator input, and at least partially automated guidance of the motor vehicle along at least one section of the selected trajectory.

US 2019/0077458 A1 discloses systems and methods for operating a driver assistance system of a motor vehicle, wherein the motor vehicle has at least one radar sensor which captures the environment of the motor vehicle. The radar sensor data is evaluated to form an environmental model describing the environment of the motor vehicle. If at least one query criterion is satisfied, an environmental map derived from the environmental model, an illustrating top view of regions, which can and cannot be traveled is played on the display device. During an interaction during the driver and displayed environmental map, trajectory data describing a desired trajectory of the driver is determined, and the motor vehicle is at least partially automatically guided along a real trajectory derived from the trajectory data.

It is an object of the invention to provide a method, a computer program product, a computer readable storage medium as well as an assistance system, by which a more efficient at least partially autonomous motor vehicle maneuver is realized.

This object is solved by a method, a computer program product, a computer readable storage medium as well as an assistance system according to the independent claims. Advantageous forms of configuration are presented in the dependent claims.

SUMMARY

One aspect of the invention relates to a method for generating a trajectory for a motor vehicle, the method comprising the steps of detecting a path, which is walked by a person, and generating the trajectory for the motor vehicle based on the detected path.

In particular the method is performed by an assistance system of the motor vehicle comprising at least an electronic computing device. Preferably, the electronic computing device is part of the motor vehicle. Alternatively, the electronic computing device may be part of a vehicle external server.

Therefore, the person, which may be, for example, a driver of the motor vehicle, gets down from the motor vehicle and checks if the path is suitable or not for the motor vehicle and walks in the required path. The path is detected and depending on the walked path the trajectory is generated for the motor vehicle.

Therefore, a more efficient way is presented in order to realize an autonomous maneuver of the motor vehicle.

In particular, the method may be provided as a computer implemented method.

In an advantageous form of configuration, the path is detected by detecting a position of a mobile device carried by the person. The mobile device, which may be, for example, a smartphone or a wearable device, which is held by the person, in particular, when the person is outside of the motor vehicle, and is connected to the motor vehicle, tracks the driver's path and stores it in the mobile device memory in terms of coordinates which may be obtained from the sensors of the mobile device. Preferably, the positioning device is configured to record its positions along a walked trajectory. In particular, the positioning device records the trajectory via GPS and/or differential GPS. Alternatively or additionally, the mobile device is configured such that a localization inside a building is performed. The sensors of the mobile device may comprise, for example, a GPS (Global Positioning Sensor), a gyroscope, or an accelerometer and/or a magnetometer. When the person reaches the final position, the person checks the path in the handheld device and may modify the trajectory based on need and transfers the planned trajectory to the motor vehicle and asks the motor vehicle to follow the path. For example, a vehicle external camera, e.g. of an infrastructure, in particular parking infrastructure, detects the walked path of the person. Alternatively, a camera of the vehicle detects the path of the person. Preferably, at least 40, 50, 60, 70, 80 or 90% of the detected path of the person is essentially identical to the trajectory.

According to an advantageous embodiment a plurality of positions of the mobile device are tracked for detecting the path. In particular, the plurality of positions is automatically tracked and/or each position of the plurality of positions is automatically tracked in a predetermined time interval. For example, the plurality of positions may be tracked every half meter. In other words, when the person walks a half meter, a new position is tracked by the mobile device. Alternatively or additionally, the position is automatically tracked in a predetermined time interval. For example, every five seconds, a position is automatically tracked by the mobile device. Therefore, the positions are tracked in a very detailed interval, wherein a very detailed planned trajectory may be transmitted to the electronic computing device.

In another advantageous form of configuration the detected path is wirelessly transmitted from the mobile device to the motor vehicle. Therefore the person may not be disturbed by a cable connection during the walking of the path. The wireless connection maybe for example a WiFi connection, a Bluetooth connection or a connection via a mobile network.

In another embodiment, after the person has left the motor vehicle, a start position of the trajectory is automatically generated by the mobile device. In particular, if the person, which may be the driver of the motor vehicle, stops the motor vehicle, the mobile device may be automatically connected to the electronic computing device of the motor vehicle, which may be, for example, an infotainment of the motor vehicle. The driver may select the method trajectory planning on the mobile device, which is connected, and the person is authenticated, for example by means of a MAC address, if it is connected by WiFi or some authentication pin if it is connected via Bluetooth. The park brake of the motor vehicle is automatically engaged by the motor vehicle when the person selects the method of trajectory planning. In a next step, the person may open the door, leaves the motor vehicle and closes the door. When the person closes the door, the door close information is shared with the mobile device. The mobile device, which is connected to the motor vehicle, automatically generates the start position and records the person's path. A camera of the motor vehicle may identify the person in the surroundings of the motor vehicle. The person is asked to walk in front of the motor vehicle, so the motor vehicle will identify the driver.

Preferably, upon an input by the person on the mobile device, an endpoint of the trajectory is automatically generated by the mobile device and/or upon the input the planned trajectory is generated by the mobile device. Therefore, if the person presses, for example, a button on the mobile device, the endpoint is automatically generated. Therefore, every position between the starting point and the endpoint is automatically tracked by the mobile device. After the endpoint is automatically generated, the planned trajectory is automatically generated by the mobile device. For example, the person may press a stop button on the mobile device when he reaches the end position. When the person presses the stop button, the park recording is stopped. If the person does not press a so-called "redo button", the trajectory recorded is stored in the mobile device. After storing, the planned trajectory is transmitted to the electronic computing device. The electronic computing device sends the planned trajectory to the assistance system, which may be, for example, a park control unit. The park control unit sends an acknowledgment to the electronic computing device on successfully reception of the planned trajectory. This reception may also be transferred to the person and may be displayed on the mobile device. If the park control unit determines that the trajectory information is incomplete, then it sends the same to the electronic computing device, which will be transferred to the person, in particular to the mobile device. When the trajectory information is sufficient, the park control unit asks the person whether the vehicle maneuver should be started. The person instructs the motor vehicle to start the movement by sending a command from the mobile device, which is connected to the motor vehicle. The vehicle movement will be started automatically. If the connection between the motor vehicle and the mobile device is lost, then the at least partially autonomous maneuver will be stopped in that place. The person is also able to stop the maneuver by sending a command through the mobile device.

It has further turned out to be advantageous, when the walked path by the person is detected by a detection device of the motor vehicle and the detected path is compared with the plurality of positions of the mobile device and the detected path is verified depending on the comparison. The detection device may be, for example, a radar sensor, an ultrasonic sensor, a lidar sensor or a camera. A distance between the person and the motor vehicle is calculated by the electronic computing device and this calculated distance is shared to the mobile device of the person and the person is asked to confirm this distance. It is also possible, that the head lamp of the motor vehicle will project a light at this distance, and the person has to confirm it on the mobile device. Therefore, a precise planning of the trajectory may be realized.

In another embodiment, depending on the walked path a planned trajectory is generated and displayed on the mobile device for verification of the planned trajectory by the person. The trajectory is displayed on a display device of the mobile device for verification of the planned trajectory by the person. In other words, the planned trajectory is displayed on the mobile device. The person can now check the planned trajectory on the mobile device. If there is some problem with the displayed trajectory, the person may redo the trajectory planning. Therefore, an efficient way for an at least partially autonomous maneuver of the motor vehicle is realized.

Preferably, if, before transmitting the planned trajectory, the displayed trajectory is adjusted depending on an input by a person of the display device. For example, the mobile device may comprise a touchpad, and the person may adjust the position displayed on the display device in order to adjust the trajectory. Therefore, an efficient way of planning the trajectory for the at least partially autonomous maneuver is realized.

In another advantageous form of configuration, during a following of the trajectory by the motor vehicle surroundings of the motor vehicle are monitored. In particular, the surroundings may be monitored by a detection device of the assistance system. For example, the detection device may be an ultrasonic sensor, a lidar sensor, a radar sensor or a camera. During the following of the trajectory, the motor vehicle monitors the surroundings, wherein a safe following of the trajectory is realized by the motor vehicle.

In another advantageous form of configuration, if an obstacle is detected in the surroundings of the motor vehicle, a warning message is generated for the mobile device for verification and/or for warning the person. In particular, if the obstacle is detected, for example, an image of the obstacle is transmitted to the mobile device. The person is then warned and may then authenticate the obstacle. For example, if the obstacle is just a small obstacle, the person may not verify this as an obstacle, which is relevant for the motor vehicle, and the trajectory is followed by the motor vehicle. If the obstacle is a big obstacle, it is possible that the person may send a new trajectory to the motor vehicle. Therefore, a more efficient and safe way for an at least partially autonomous maneuver is realized.

In another advantageous form of configuration, if an obstacle in the surroundings of the motor vehicle is detected, the obstacle is illuminated. For example the obstacle may be illuminated by a lighting device of the assistance system. The lighting device may be the head lamps of the motor vehicle. Therefore, the obstacle is illuminated, and the person may see the obstacle, which is detected as an obstacle from the motor vehicle. The person then may decide, if the obstacle is dangerous for the motor vehicle or not.

In another advantageous form of configuration, if an obstacle in the surroundings of the motor vehicle is detected, the motor vehicle automatically drives around the detected obstacle. Therefore, without an intervention of the person, the motor vehicle may automatically drive by the obstacle. Therefore, a more efficient and at least partially autonomous maneuver of the motor vehicle may be realized.

Furthermore, it has turned out to be advantageous, if depending on the plurality of tracked positions, the trajectory is planned by omitting positions that are not relevant to the trajectory. For example, if there are some positions, which are very near to each other, these positions may be omitted by the electronic computing device. Furthermore, if some positions are not relevant for the trajectory, for example, because there are not relevant for the planned trajectory, these positions are also omitted. Furthermore, positions may be omitted because of physical boundary conditions of the motor vehicle, like a turning circle of the motor vehicle. Therefore the resulting trajectory may distinguish from the walked path. Therefore, a more efficient way for an at least partially autonomous maneuver of the motor vehicle is realized.

A further aspect of the invention relates to a computer program product with program code means, which are stored in a computer readable storage medium, to perform the method according to the preceding aspect when the computer program product is run on a processor of an electronic computing device.

A still further aspect of the invention relates to a computer readable storage medium with a computer program product, in particular an electronic computing device with a computer program product, according to the preceding aspect.

Another aspect of the invention relates to an assistance system for a motor vehicle for generating a trajectory of an at least partially autonomous motor vehicle, wherein the assistance system comprises at least an electronic computing device, wherein the assistance system is configured to perform a method according to the preceding aspect. In particular, the method is performed by the assistance system.

A still further aspect of the invention relates to a motor vehicle with an assistance system according to the preceding aspect. In particular, the motor vehicle is at least partially autonomous. The motor vehicle may be fully autonomous.

Advantageous forms of the method are to be regarded as advantageous forms of the computer program product, the computer readable storage medium, the assistance system as well as the motor vehicle. The assistance system as well as the motor vehicle comprise means for performing the method.

BRIEF DESCRIPTION

Further features of the invention are apparent from the claims, the figures, and the description of figures. The features and feature combinations mentioned above in the description as well as the features and feature combinations mentioned below in the description of figures and/or shown in the figures alone are usable not only in the respectively specified combination, but also in other combinations without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not comprise all of the features of an originally formulated independent claim. Moreover, implementations and feature combinations are to be considered as disclosed, in particular by the implementations set out above, which extend beyond or deviate from the feature combinations set out in the relations of the claims.

Now, the invention is explained in more detail based on preferred embodiments as well as with reference to the attached drawings.

Figure 1:
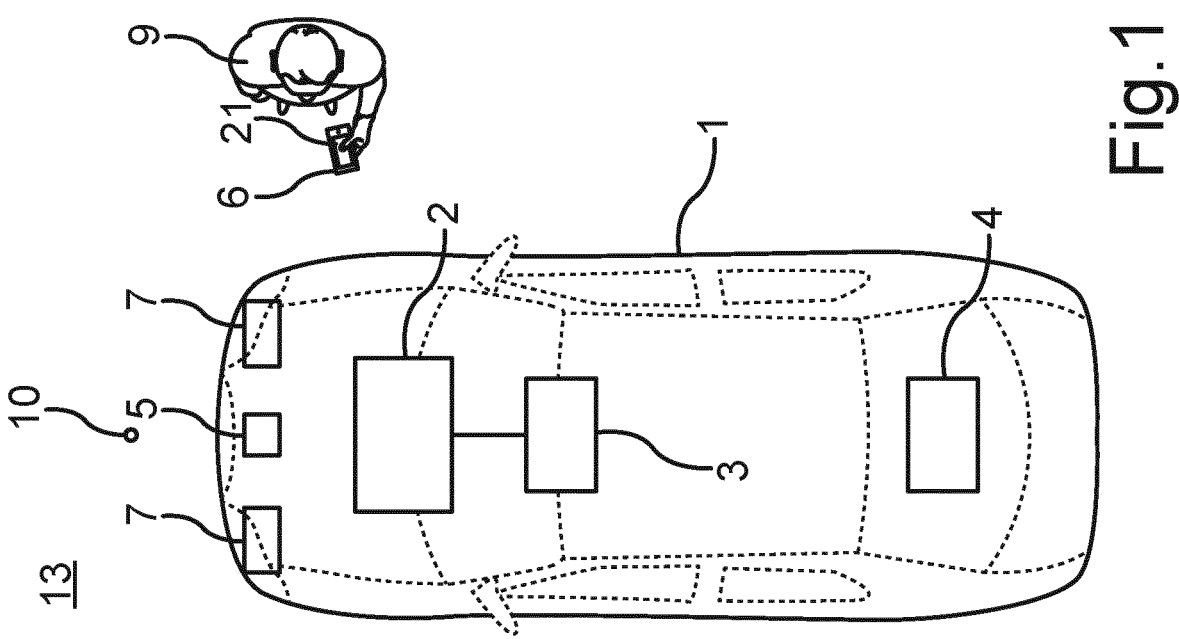
Figure 3:
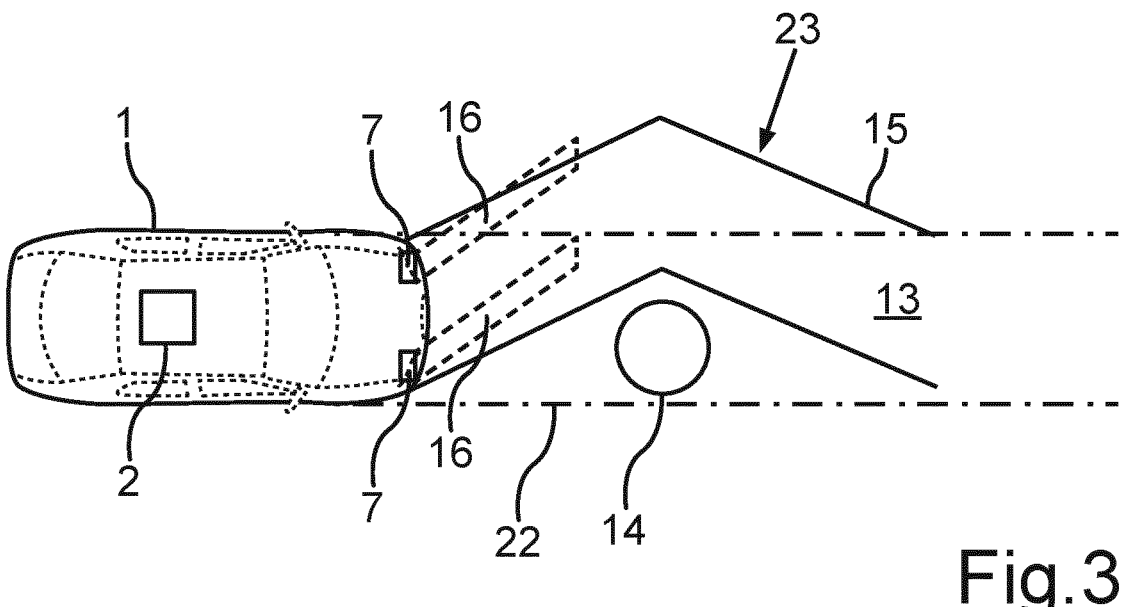
Figure 4:
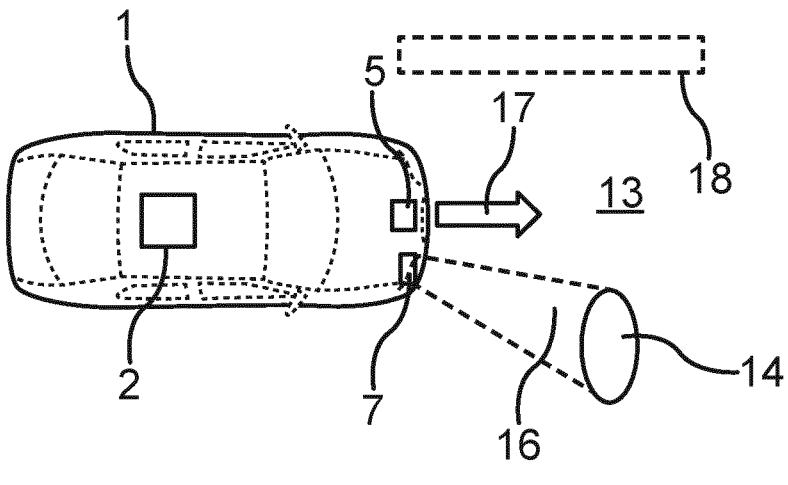
Figure 5:
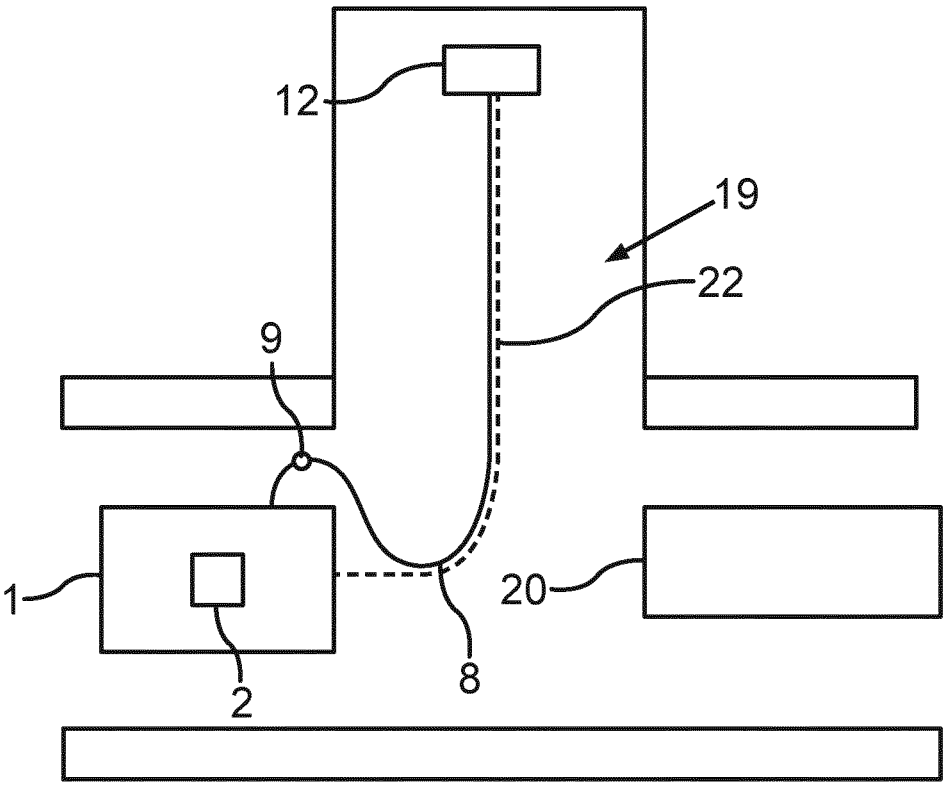

There show:

FIG. 1 a schematic top view of an embodiment of a motor vehicle with an embodiment of an assistance system;

FIG. 2 another schematic top view of a motor vehicle according to FIG. 1 with a planned trajectory;

FIG. 3 another schematic top view of an embodiment of a motor vehicle;

FIG. 4 another schematic top view of an embodiment of the motor vehicle;

FIG. 5 another schematic top view of an embodiment of a motor vehicle; and

Figure 6:
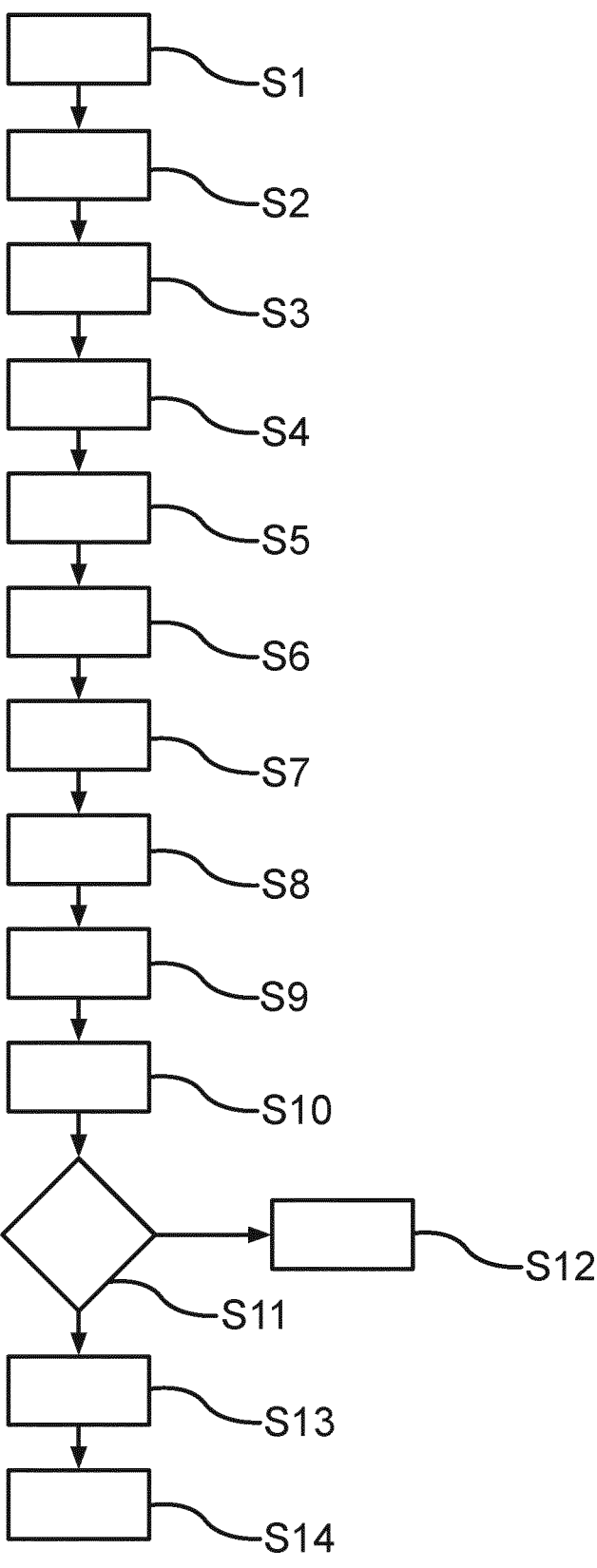

FIG. 6 a schematic flow chart according to an embodiment of the method.

In the figures, identical or functionally identical elements are provided with the same reference characters.

DETAILED DESCRIPTION

FIG. 1 shows a schematic top view of a motor vehicle 1 with an embodiment of an assistance system 2. The assistance system 2 at least comprises an electronic computing device 3. The motor vehicle 1 may comprise a functional device 4, which is, for example, a device for driving the motor vehicle 1 at least partially autonomously. In particular, the functional device 4 may comprise a park control unit, which is the master and responsible for a maneuver preparing environmental data by processing data from other control units and also data from its own detection device 5. The park control unit also classifies avoidable and unavoidable threats through the environmental data and sends this notification to an infotainment system of the motor vehicle 1. Furthermore, the functional device 4 may comprise a front camera unit, for identifying front objects and also detecting humans. The front camera unit may also be the detection device 5. Furthermore, the functional device 4 may also comprise an infotainment unit used to connect a mobile device 6, which may be, for example, a smartphone or a wearable, transceiving the data from the mobile device 6 and transferring it to the control unit. The infotainment may also identify the mobile device 6 for authentication and sending the authentication data to a so-called immobilizer. The immobilizer is used for authentication based on encryption keys shared by the mobile device 6. The functional device 4 may also comprise a brake unit, which is responsible for stopping the motor vehicle 1, implying a park brake based on data received from the park control unit. Furthermore, the functional device 4 may comprise a surround view camera, identifying threats and also capturing surroundings and notifying it to the park control unit. Furthermore, the functional device 4 may comprise a radar control unit for identifying threats or notifying it to the park control unit. The functional device 4 may also comprise a front cross traffic alert radar unit to detect cross-dimensional threats and notifying it to the park control unit. The functional device 4 may also comprise a front lidar unit for identifying threats and notifying it to the park control unit. The functional device 4 may comprise a head lamp unit for projecting light towards the threat based on data received from the park control unit. Therefore, the motor vehicle 1 may comprise head lamps 7. The functional device 4 may also comprise an engine management system used for acceleration, and motor vehicle movement based on data received from the park control unit. The functional device 4 may also comprise an electric power steering used for vehicle lateral control based on the data received from the park control unit. The functional device 4 may also comprise a transmission control unit used for the motor vehicle longitudinal control based on data received from the park control unit. The mobile device 6 is in particular configured for the trajectory path plotting, and accepting or rejecting obstacles 14 (FIG. 2), which may be detected by the detection device 5.

In particular, the electronic computing device 3 may comprise a computer program product as well as corresponding computer readable storage medium.

FIG. 1 shows the motor vehicle 1 with an embodiment of the assistance system 2 for a generating a trajectory 22 (FIG. 2) for a motor vehicle 1, the method comprising the steps of detecting a path 8 (FIG. 2), which is walked by the person 9, and generating the trajectory 22 for the motor vehicle 1 based on the detected path 8.

In an embodiment the mobile device 6 is carried by a person 9 during a planning phase of the trajectory 22 and a plurality of positions a-m of the mobile device 6 are tracked by a positioning device of the mobile device 6 depending on the path 8 performed by the person 9, wherein the mobile device 6 generates the trajectory 22 depending on the plurality of tracked positions a-m, and the trajectory 22 is wirelessly transmitted from the mobile device 6 to the electronic computing device 3.

With the detection device 5, which may be, for example, a lidar sensor, a radar sensor, an ultrasonic sensor, or a camera, a detection position 10 of the person 9 may be detected.

FIG. 2 shows another schematic top view of the motor vehicle 1 with the generated trajectory 22 and the walked path 8. In particular, FIG. 2 shows that the plurality of positions a-m are automatically tracked and/or each position a-m of the plurality of positions a-m is automatically tracked in a predetermined time interval.

Furthermore, it is shown that after the person 9 has left the motor vehicle 1, a start position 11 of the trajectory 22 is automatically generated by the mobile device 6. Furthermore, upon an input by the person 9 on the mobile device 6 an end point 12 of the trajectory 22 is automatically generated by the mobile device 6 and/or upon the input, the trajectory 22 is generated by the mobile device 6.

The detection device 5 of the assistance system 2 may detect the person 9 during the planning phase and the tracking of the plurality of positions a-m and the transmitted trajectory 22 is authenticated by the electronic computing device 3 by comparing the transmitted trajectory 22 with the path 8 performed by the detected person 9. In particular, before transmitting the trajectory 22 to the electronic computing device 3, the trajectory 22 is displayed on a display device 21 of the mobile device 6 for verification of the trajectory 22 by the person 9.

Furthermore, before transmitting the trajectory 22, the trajectory 22 may be adjusted depending on an input by the person 9 on the display device 21.

FIG. 2 shows that during following of the trajectory 22 by the motor vehicle 1, surroundings 13 of the motor vehicle 1 are monitored by the detection device 5 of the motor vehicle 1. In particular, if the detection device 5 detects an obstacle 14 in the surroundings 13 of the motor vehicle 1, the electronic computing device 3 transmits a warning message to the mobile device 6 for verification and for warning the person 9. Furthermore, if the detection device 5 detects the obstacle 14 in the surroundings 13 of the motor vehicle 1, the obstacle 14 is illuminated by a lighting device, which may be, for example, the head lamp 7 of the assistance system 2. Furthermore, if the detection device 5 detects the obstacle 14 in the surroundings 13 of the motor vehicle 1, the motor vehicle 1 automatically drives around the detected obstacle 14.

In another embodiment, depending on the plurality of tracked positions a-m, the trajectory 22 is planned by omitting positions a-m that are not relevant for the trajectory 22. For example, if there are some positions a-m, which are very near to each other, these positions a-m may be omitted by the electronic computing device 3. Furthermore, if some positions a-m are not relevant for the trajectory 22, these positions a-m are also omitted. Furthermore, positions a-m may be omitted because of physical boundary conditions of the motor vehicle 1, like a turning circle of the motor vehicle 1. Therefore the resulting generated trajectory 22 may distinguish from the walked path 8.

FIG. 2 shows an example for the trajectory planning. The parking assistance unit plots the trajectory 22 and at every turn or curve or unusual path 8, it will assign a position a-m for identification. The motor vehicle 1 starts the movement when it reaches the direction change at point d, it senses the environment using the camera, radar and lidar to see any obstacle 14 is present in the direction change from the point d to e. When it does not find any obstacle 14, it will move to the point e. For example, if the distance between the direction change from point d to e is around 15 meters, and it finds some obstacles 14 in between, the motor vehicle 1 will check the points a, b, c, if it finds moving the motor vehicle 1 towards points b and c as unnecessary, and the motor vehicle 1 will move towards point a. This is also applicable for plotting places. In the direction change f, h, j, the motor vehicle 1 neglects the position j and moves from point f to h. When the direction changes on the positions i, j, k, l, m, the motor vehicle 1 neglects direction change from point k to j and draws its own trajectory path from the direction change from point i to l and then move the motor vehicle 1 towards it.

FIG. 3 shows another top view of the motor vehicle 1 with the head lamp 7. FIG. 3 shows, if the motor vehicle 1 detects an obstacle 14 on the generated trajectory 22, it will then automatically change the generated trajectory 22 to the driven trajectory 23, wherein a direction change is shown by the reference sign 15. A light projection 16 may show the person 9 that the direction change 15 is performed automatically by the motor vehicle 1. In particular, if the obstacle 14 is in the generated trajectory 22 and the motor vehicle 1 changes the direction, which will not affect the course of the trajectory 22, then the motor vehicle 1 takes its own decisions and move it that way, which is shown in FIG. 3 with the reference sign 15. It informs the person 9 like rerouting the trajectory 22 to his mobile device 6. The motor vehicle 1 also projects the light towards that direction in order to produce a driver feedback on the trajectory 22.

FIG. 4 shows another schematic top view of the motor vehicle 1 with the head lamp 7. According to a different embodiment, the detection device 5 detects the obstacle 14 in the surroundings 13 and the motor vehicle 1 illuminates the obstacle 14 with the lighting device, in particular with the head lamp 7, of the assistance system 2. Furthermore, a driving direction 17 is shown in the FIG. 4. Along with the projection 16 toward the obstacle 14, the motor vehicle 1 is monitoring the surroundings 13 and the obstacle 14 is captured through the surround view camera, for example, the front camera. An image of the obstacle 14 may then be transmitted to the person 9, for example, in a video format, and if the driver finds the obstacle 14 as valid, he will select, for example, a button, for example a red button, on the mobile device 6. The autonomous maneuver will then be avoided. If the obstacle 14 is not a valid threat for the motor vehicle 1, the person 9 may choose for example a further button shown on the mobile device 6, for example a green button, and the motor vehicle 1 will further proceed with the autonomous maneuver.

If the motor vehicle 1 is not able to replan the trajectory 22 because it finds a false obstacle 14 and mentions it as an obstacle 14, the person 9 is asked to redo the path 8 and the person 9 can select the option to redo. The person 9 may replan the path 8 when he reaches, for example, the position n in the FIG. 2, and a popup on the mobile device 6 may appear in order to replan the path 8, wherein this path 8 may be attached to the existing trajectory 22. The person 9 may select the option yes and the replanned path 8, as shown in FIG. 2, is shared to the motor vehicle 1 and the autonomous maneuver is started again and the motor vehicle 1 will head towards the end position 12.

FIG. 5 shows an example according to an embodiment of the method. In this shown example, the person 9 wants to park the motor vehicle 1 in a garage 19. The garage 19 may not be detected by the motor vehicle 1 because another motor vehicle 20 is present in front.

The person 9 gets down from the motor vehicle 1 and walks in the required path 8, and the path 8 is detected by the motor vehicle 1. In particular, the path 8 may be detected by the mobile device 6 or the wearable, which is held by the person 9 and which is connected to the motor vehicle 1 tracks the driver's path 8 and stores it in the device memory of the mobile device 6 in terms of coordinates, which may be obtained from the sensors of the mobile device 6. When the person 9 reaches the end position 12, the person 9 checks the path 8 in the mobile device 6 and modifies it based on the need and transfer the trajectory 22 to the motor vehicle 1 and asks the motor vehicle 1 to follow the trajectory 22.

FIG. 6 shows a schematic flow chart according to an embodiment of the method. In a first step S1, the person 9 may stop the motor vehicle 1 and connects the mobile device 6 to the motor vehicle's infotainment and selects the trajectory planning on the infotainment. When the person 9 chooses the trajectory planning, the mobile device 6 is connected and will be authenticated, for example, by means of a MAC address, if it is connected via WiFi or some authentication pin if it is connected via Bluetooth. The park brake is engaged by the motor vehicle 1 when the person 9 chooses the trajectory planning. In a second step S2, the person 9 gets down and closes the door of the motor vehicle 1. In a third step S3, the trajectory path recording is started automatically. When the person 9 closes the door, the door close information is shared to the mobile device 6. The mobile device 6 is connected to the motor vehicle 1 and will start recording the person's path 8. The detection device 5 may identify the person 9, and the person 9 is asked to walk in front of the motor vehicle 1, so the motor vehicle 1 will identify the person 9. In a fourth step S4, the person's movement x and y axes are detected using the sensors of the mobile device 6, and it is stored in the memory of the mobile device 6. Therefore, the person 9 is starting to walk. The application present in the mobile device 6 with the sensors records the movement of the person 9 in coordinates for the movement. The movement is stored continuously in the mobile device 6.

In a fifth step S5, the detection device 5, in particular the camera, may detect the person 9 and, for example, with the help of ultrasonic sensors, a distance between the person 9/the mobile device 6 and the motor vehicle 1 is recorded for authentication and to locate the start position 11. In particular, when the person 9 reaches the detecting position 10, the detection device 5 will detect the person 9. When the person 9 is in a predetermined position, the mobile device 6 will be notified by the motor vehicle 1. The distance between the person 9 and the motor vehicle 1 is calculated by the park control unit and the same distance is shared to the mobile device 6, wherein the person 9 is asked to confirm the distance. The head lamp 7 projects the light at the distance, as, for example, shown in FIG. 4. The person 9 confirms it in the mobile device 6.

In a sixth step S6, the person 9 reaches the end position 12 and chooses to stop the trajectory calculation or the person 9 may press a redo in order to change the path 8 in between at the end position 12. Therefore, the person 9 may press a stop button when he reaches the end position 12. When the person 9 presses this stop button, the path recording is stopped. If the person 9 does not press the redo button, the path 8 recorded is stored in the mobile device 6 like the path 8 shown in FIG. 2. The person 9 may press the redo button in between or once he reaches the end position 12. If the person 9 presses the redo button, the steps already mentioned are performed. If the person 9 sees the current path 8 is not satisfactory, then the person 9 selects the path planning, so in this case, the path redo is pressed at any position. The direction change may be as a pop-up shown in the mobile device 6 for the trajectory replanning. For example, the person 9 may select the replan from the position c, the path 8 is replanned after the position c, and after the path is shared to the motor vehicle 1, the motor vehicle 1 follows it.

In a seventh step S7, the person 9 may press a send button on the mobile device 6 and the trajectory 22 depending on the walked path 8 is transmitted to the electronic computing device 3, wherein the trajectory 22 is transferred to, for example, the park control unit. Before the park control unit may send an acknowledgement to the electronic computing device 3 on successful reception of the trajectory 22, the acknowledgement is also transferred to the mobile device 6. If the park control unit sees the trajectory information is incomplete, then it sends the same to the electronic computing device 3, which may be transferred to the mobile device 6. Preferably, in this case a notification can be output to the person 9 via the mobile device 6 to record a new path 8. The person 9 then records the new path 8 which may be transmitted to the electronic computing device 3. In an eights step S8, the person 9 commands the motor vehicle 1 to follow the trajectory 22. When the trajectory information is sufficient, the park control unit asks the person 9 the motor vehicle maneuver shall be started. If the person 9 tells the motor vehicle 1 to start the movement, the mobile device 6 sends the command to the motor vehicle 1. In a ninth step S9, the vehicle maneuver is started, and it follows the trajectory 22 specified by the person 9. In particular, this is shown in FIG. 2. The vehicle movement is started, wherein the person 9 has to be, in particular, inside of the motor vehicle 1. If the connection between the motor vehicle 1 and the mobile device 6 is lost, then the maneuver may be stopped in that place. The person 9 may also stop the maneuver by sending a command through the mobile device 6.

In a tenth step S10, the motor vehicle 1 may find an obstacle 14 and it will project the head lamp 7 towards the obstacle 14 and ask the confirmation from the person 9. In particular, this is shown in FIG. 3 and FIG. 4.

In step S11, the person 9 may select the obstacle 14 as a valid obstacle 14 or not. This validation may be performed via the mobile device 6. If the person 9 finds the obstacle 14 as valid, he selects, for example, a red button on the mobile device 6, and then the system will go to step S12, and if it is not an obstacle 14, then the person 9 may select, for example, a green button, and the system will move to a thirteenth step S13. In the twelfth step S12, the person 9 should choose to redo the walked path 8 or end the maneuver at the place. In particular, this is performed, when the person 9 chooses that the obstacle 14 is a valid threat. If the obstacle 14 is not a valid threat, the motor vehicle 1 will pass over the false positive obstacle 14.

When the motor vehicle 1 reaches the end position 12 in a fourteenth step S14, the motor vehicle 1 will notify the person 9 through the mobile device 6. If the autonomous maneuver was a parking maneuver, then the person 9 turns off the engine and locks the motor vehicle 1 using the mobile device 6. If the maneuver assists the person 9, the person 9 gets inside of the motor vehicle 1 and continues the driving or stops the motor vehicle 1.

I claim:

1. A method for maneuvering a motor vehicle, the method comprising:
    detecting a path, which is walked by a person;
    generating a trajectory for the motor vehicle based on the detected path; and
    starting the motor vehicle to follow the generated trajectory,
    wherein:
        the path is detected by tracking a plurality of positions of a mobile device carried by the person,
        the path is also detected by a detection device of the motor vehicle,
        the detected path by the detection device is compared with the plurality of positions of the mobile device, and
        the detected path is verified based on the comparison.

2. The method according to claim 1, wherein the detected path is wirelessly transmitted from the mobile device to the motor vehicle.

3. The method according to claim 1, wherein after the person has left the motor vehicle a start position of the trajectory is automatically generated.

4. The method according to claim 1, wherein depending on the walked path the trajectory is generated and displayed on the mobile device for verification of the trajectory by the person.

5. The method according to claim 1, wherein during the following of the trajectory by the motor vehicle surroundings of the motor vehicle are monitored.

6. The method according to claim 5, wherein if an obstacle is detected in the surroundings of the motor vehicle, a warning message is generated for the mobile device for verification and for warning the person.

7. The method according to claim 5, wherein if an obstacle is detected in the surroundings of the motor vehicle, the obstacle is illuminated by a lighting device of the motor vehicle.

8. The method according to claim 5, wherein if an obstacle is detected in the surroundings of the motor vehicle, the motor vehicle automatically drives around the detected obstacle.

9. The method according to claim 1, wherein the trajectory is generated by omitting positions that are not relevant to the trajectory.

10. A non-transitory computer readable medium containing program instructions for causing a processor to perform the method of claim 1.

11. An assistance system for a motor vehicle for maneuvering an at least partially autonomous motor vehicle, wherein the assistance system comprises at least an electronic computing device, wherein the assistance system is configured to perform the method according to claim 1.

12. The assistance system according to claim 11, wherein: the assistance system is further configured to detect an obstacle in the generated trajectory of the motor vehicle, and automatically rerouting the motor vehicle around the detected obstacle.

13. The method according to claim 1, further comprising: detecting an obstacle in the generated trajectory of the motor vehicle; and automatically rerouting the motor vehicle around the detected obstacle.

14. The method according to claim 13, wherein the automatically rerouting comprises:
    automatically changing a direction of the motor vehicle to drive around the detected obstacle, and
    automatically changing the direction of the motor vehicle to continue the following of the generated trajectory.

* * * * *